(No Model.)

J. L. BRINLY.
CULTIVATOR.

No. 501,818. Patented July 18, 1893.

WITNESSES
G. S. Elliott
W. Johnson

John L. Brinly
INVENTOR by _____ Attorney

United States Patent Office.

JOHN L. BRINLY, OF LOUISVILLE, KENTUCKY.

CULTIVATOR.

SPECIFICATION forming part of Letters Patent No. 501,818, dated July 18, 1893.

Application filed April 13, 1893. Serial No. 470,214. (No model.)

*To all whom it may concern:*

Be it known that I, JOHN L. BRINLY, a citizen of the United States of America, residing at Louisville, in the county of Jefferson and State of Kentucky, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in cultivators, or double shovel plows, the object of the same being to provide a simple, cheap and effective attachment which can be readily attached to the beam to connect thereto the standards to which the cultivators or shovels are attached.

Figure 1:
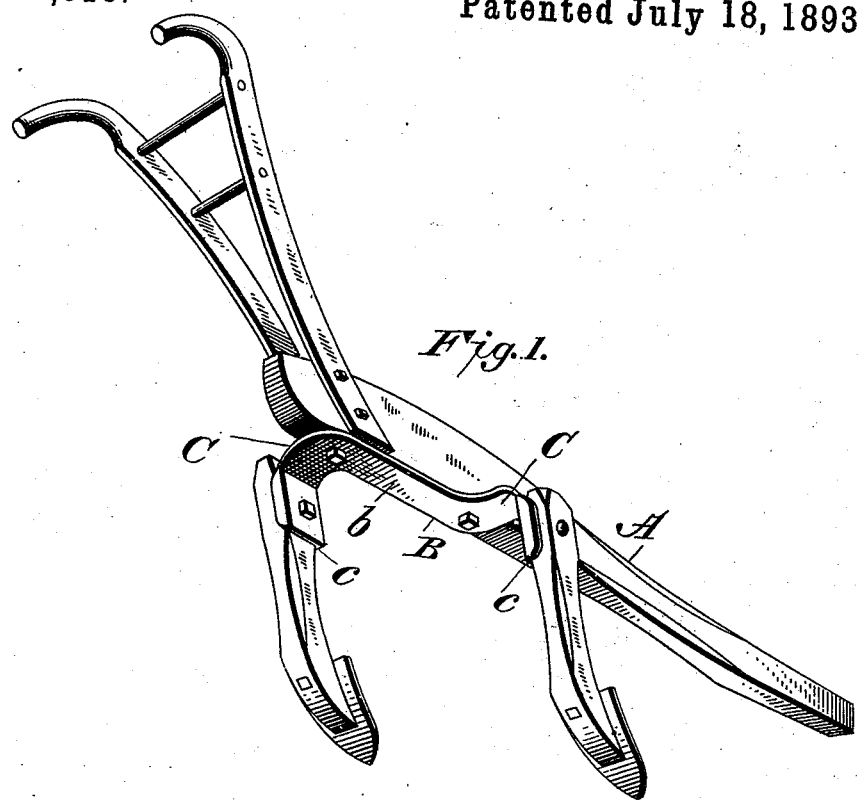
Figure 2:
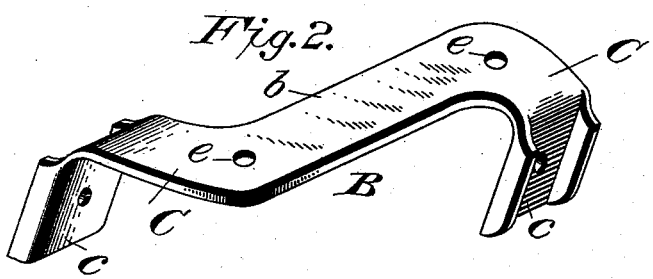

In the accompanying drawings, forming part of this specification, Figure 1 is a perspective view, showing the invention applied, and Fig. 2 is a perspective view of the plate detached.

A designates the beam, which is of ordinary construction, and secured to the rear end thereof, in the usual manner, are the handles.

B designates a plate, comprising a central portion, *b*, from which project laterally extending members C C. The laterally projecting members are bent downwardly at their outer ends, as shown at *c c*, and to these downwardly bent portions the standards of the cultivator shovels are rigidly secured, said downwardly bent portions being flared at their edges to embrace the standards and perforated to receive the securing bolts. The part *b* of the plate or fixture, adjacent to the laterally extending members, is provided with apertures or bolt-holes *e e*, through which pass the bolts for attaching the fixture to the beam.

In practice the fixture B is made of a single piece, and when attached to the plow beam the rear laterally projecting member may be located under the part of the beam where the handles are attached.

The device hereinbefore described is simple in construction, and can be readily attached to the plow beam, two ordinary bolts being used for such purpose, and the laterally projecting members with the depending portions will hold the shovel standards securely in place.

I am aware that prior to my invention it has been proposed to provide a plow beam with independent sockets to receive the cultivator shovels, but it will be noted that the construction of the fixture herein described dispenses with a number of bolts for making the connection, and that the strain which is brought to bear upon one of the shovel plows will counteract the strain brought upon the adjacent one, and in this manner there is only a direct strain upon the bolts which attach the fixture to the beam. It will also be noticed that the laterally projecting members have their greater thickness or width in a horizontal line.

Having thus described my invention, what I claim as new, and desire to secure by Letters Patent, is—

1. In a cultivator, the combination with the beam A and standards carrying shovels, of a plate B comprising a central portion having bolt holes for securing the same to the under side of the beam, laterally projecting members C C which project in opposite directions the end portions thereof being bent downwardly and provided with outwardly projecting parallel flanges and bolt holes, substantially as shown, and for the purpose set forth.

2. A fixture for securing standards to a plow beam, comprising a flat central plate with bolt-holes or apertures adjacent to the ends thereof, the end portions of the plate having laterally projecting members the ends of which are bent downwardly, and means for securing thereto the independent shovel carrying standards, substantially as shown, and for the purpose set forth.

In testimony whereof I affix my signature in presence of two witnesses.

JOHN L. BRINLY.

Witnesses:
SAML. J. DOHRMANN,
FRANK B. PELLEY.